United States Patent [19]
Yoshikawa et al.

[11] 4,427,641
[45] Jan. 24, 1984

[54] METHOD OF RECOVERING URANIUM FROM WET PROCESS PHOSPHORIC ACID WITH ENHANCED CONTENT OF URANIUM

[75] Inventors: Seizi Yoshikawa, Yamaguchi; Ryuichi Nakamura, Ube, both of Japan

[73] Assignee: Central Glass Company Limited, Ube City, Japan

[21] Appl. No.: 287,151

[22] Filed: Jul. 27, 1981

[30] Foreign Application Priority Data

Jul. 28, 1980 [JP] Japan ................... 55-102409

[51] Int. Cl.$^3$ ................. B01D 11/00; B01F 11/00; C01G 43/00; C01B 25/16
[52] U.S. Cl. ................................. 423/18; 423/11; 423/20; 423/320; 423/555; 423/166
[58] Field of Search ............... 423/320, 321 R, 321 S, 423/11, 18, 20, 555, 166

[56] References Cited

U.S. PATENT DOCUMENTS

| | | | |
|---|---|---|---|
| 2,767,045 | 10/1956 | McCullough | 423/18 |
| 2,799,557 | 7/1957 | Seyfried | 23/109 |
| 2,885,264 | 5/1959 | Peet | 423/166 |
| 3,632,307 | 1/1972 | Ven Es et al. | 423/166 |
| 3,745,208 | 7/1973 | Bigot et al. | 423/320 |
| 4,311,677 | 1/1982 | Gerunda et al. | 423/20 |

FOREIGN PATENT DOCUMENTS

| | | |
|---|---|---|
| 2012544 | 3/1970 | France. |
| 43-17415 | 7/1968 | Japan. |
| 45-14405 | 5/1970 | Japan. |
| 45-27323 | 9/1970 | Japan. |

OTHER PUBLICATIONS

Chemical Abstracts, vol. 80, No. 24, Jun. 17, 1974, p. 179, Abstract 136110v, Columbus Ohio & ES-A 393 518 (Junta De Energia Nuclear) 16-08-1973.

Primary Examiner—Gregory A. Heijer
Attorney, Agent, or Firm—Fleit, Jacobson, Cohn & Price

[57] ABSTRACT

In preparing wet process phosphoric acid by decomposing a phosphate rock containing uranium with sulfuric acid and phosphoric acid on condition that hemihydrate gypsum is formed in an acid solution either at the stage of decomposing the phosphate rock or subsequently, uranium contained in the phosphate rock can almost entirely be retained in the obtained phosphoric acid solution by forming the hemihydrate gypsum in the presence of an oxidizing agent, such as a soluble chlorate, hydrogen peroxide or oxygen gas, in the acid solution in a quantity sufficient to render the entire uranium dissolved in the acid solution hexavalent because hemihydrate gypsum adsorbs almost exclusively tetravalent ions of uranium. The uranium is then recovered.

10 Claims, No Drawings

METHOD OF RECOVERING URANIUM FROM WET PROCESS PHOSPHORIC ACID WITH ENHANCED CONTENT OF URANIUM

BACKGROUND OF THE INVENTION

This invention relates generally to the preparation of wet process phosphoric acid, and more particularly to an improvement on a conventional wet process for the preparation of a phosphoric acid solution with a special view to enhancing the content of uranium in the phosphoric acid solution.

Phosphate rocks of natural occurrence generally contain about 100–200 ppm of uranium. In the wet process manufacture of phosphoric acid through wet decomposition of phosphate rock with a mixed acid consisting of sulfuric acid and recycled phosphoric acid, most of uranium contained in the phosphate rock transfers into a slurry of calcium sulfate in phosphoric acid solution. Since wet process phosphoric acid is manufactured in an enormous quantity, recovery of uranium from wet process phosphoric acid solution has long been tried although the uranium content in the solution is not so high. At present solvent extraction methods are predominant in this art, and in some firms the recovery of uranium from wet process phosphoric acid has already been put into industrial practice.

According to the form of calcium sulfate as an important by-product, practical techniques for the manufacture of wet process phosphoric acid can be classified into five groups; namely, anhydrite process, hemihydrate process, dihydrate process, dihydrate-hemihydrate process, and hemihydrate-dihydrate process. Among these processes, the most popular is the dihydrate process wherein calcium sulfate is separated in the form of dihydrate, i.e. gypsum in a narrow sense. The hemihydrate process wherein calcium sulfate is precipitated as hemihydrate, the hemihydrate-dihydrate process wherein calcium sulfate is intermediately formed as hemihydrate and subsequently converted to dihydrate by treatment in a mixed acid and the dihydrate-hemihydrate process wherein calcium sulfate is formed initially as dihydrate and subsequently converted to hemihydrate by treatment in a mixed acid at a temperature above a dihydrate-hemihydrate transition point (after separation of the dihydrate from the phosphoric acid solution as the mother liquor or alternatively without separating from the solution) have been developed mainly in expectation of the growth of calcium sulfate crystals that are low in the content of phosphoric acid and easy to separate from the acid solution and the acquirement of a phosphoric acid solution which is as high as possible in the $P_2O_5$ content. The water of crystallization of calcium sulfate that precipitates in a wet process for preparation of phosphoric acid is determined by the concentration of $P_2O_5$ in the liquid phase of the reaction system and the reaction temperature. In this regard the phase equilibrium relationships are represented by the famous Nordengren's phase diagram.

Japanese Patent Applications Publication Nos. 43(1968)-17415, 45(1970)-14405 and 45(1970)-27323 show the particulars of the aforementioned dihydrate-hemihydrate process. We have recognized that when this process is performed according to the teachings of these patent documents uranium originated in phosphate rock is captured almost exclusively by the hemihydrate gypsum. For example, we have obtained the following experimental result. Phosphate rock was decomposed according to the teachings of Japanese Patent Application Publication No. 45(1970)-27323 by using a mixed acid of sulfuric acid and phosphoric acid so as to give a slurry of dihydrate gypsum. The supernatant phosphoric acid solution of this slurry (hereinafter this solution will be referred to as crude phosphoric acid) had a uranium content of 80 ppm, whereas the uranium content in the dihydrate gypsum was only 4 ppm. Sulfuric acid was added to this gypsum slurry so as to adjust the concentration of excess sulfuric acid in the slurry to the level of 3–10%, and the slurry was maintained at a temperature above the dihydrate-hemihydrate transition point in the presence of seed crystals of hemihydrate gypsum until complete conversion of the dihydrate gypsum to hemihydrate gypsum. By filtration the thus treated slurry was divided into hemihydrate gypsum and phosphoric acid for recycling. It was confirmed that the hemihydrate gypsum obtained through this procedure had a uranium content of 48 ppm, while the uranium content in the phosphoric acid had reduced to 11 ppm.

Regarding the preparation of phosphoric acid by a wet process in which hemihydrate gypsum is formed, it has become clear that about a half of uranium originally contained in the phosphate rock and transferred into the acid solution is captured by the hemihydrate gypsum.

Also it is known that tetravalent ions of uranium are more readily captured by dihydrate gypsum than the hexavalent ions of uranium. When dihydrate gypsum is dispersed in a phosphoric acid solution containing uranium in the form of tetravalent ions, the uranium content in the gypsum reaches about four times as high as that in the case of the acid solution containing uranium in the form of hexavalent ions. ("Recovery of Uranium from Phosphoric Acid (for phosphatic fertilizer)", published by Power Reactor and Nuclear Fuel Development Corporation of Japan, pp. 4–5, 1975.)

SUMMARY OF THE INVENTION

It is an object of the present invention to provide an improved method of preparing wet process phosphoric acid by using a phosphate rock containing uranium, in which method hemihydrate gypsum is formed but uranium contained in the phosphate rock is scarcely adsorbed by the hemihydrate gypsum and almost entirely remains in the prepared phosphoric acid solution.

A method according to the invention is to prepare wet process phosphoric acid by decomposing a phosphate rock containing uranium with sulfuric acid and phosphoric acid and includes a step of forming hemihydrate gypsum in a solution containing phosphoric acid. As the essential feature of the invention, the hemihydrate gypsum is formed in the presence of an oxidizing agent in a quantity sufficient to render uranium dissolved in the aforementioned solution substantially entirely hexavalent.

This invention is based upon our discovery that the transfer of uranium into hemihydrate gypsum formed in a phosphoric acid solution can almost completely be prevented, so that a nearly entire quantity of uranium originally contained in the phosphate rock remains in the phosphoric acid solution, by keeping uranium dissolved in the solution entirely in the hexavalent state during the stage of forming hemihydrate gypsum. We have confirmed that both tetravalent ions and hexavalent ions of uranium are present in gypsum slurries formed in the conventional wet processes for the preparation of phosphoric acid. In the present invention the oxidizing agent is used to oxidize the tetravalent ions of uranium to the hexavalent ions. As the oxidizing agent, either a water-soluble inorganic oxidizer such as chlorate or peroxide or an oxidizing gas can be used.

As mentioned hereinbefore, it is known that tetravalent ions of uranium are more readily adsorbed by dihydrate gypsum than the hexavalent ions. Nevertheless, it is a surprising discovery that in the case of hemihydrate gypsum in an acid solution containing both tetravalent ions and hexavalent ions of uranium the gypsum adsorbs the tetravalent ions with a selectivity factor of nearly 100%. It will be recalled that in the case of dihydrate gypsum the selectivity factor for adsorption of tetravalent ions of uranium remains at the level of about 80%, meaning that the hexavalent ions too are adsorbed by dihydrate gypsum to a considerable extent.

By the method according to the invention, the loss of uranium originally contained in phosphate rock by adsorption in hemihydrate gypsum can be limited to only about 1–2 percent. Accordingly, the phosphoric acid solution obtained by this method has a remarkably enhanced content of uranium. Also it is an advantage of this invention that such a great improvement on the efficiency of recovery of uranium can be achieved simply by the addition of a relatively inexpensive oxidizer, without the need of modifying the fundamental steps of the corresponding conventional process.

The method of the invention can be embodied in any of the so-called hemihydrate process, dihydrate-hemihydrate process and hemihydrate-dihydrate process. In every case, it is possible to retain about 98–99% of uranium originally contained in phosphate rock in the phosphoric acid as the product of the process.

A disadvantage of the conventional hemihydrate process, dihydrate-hemihydrate process and hemihydrate-dihydrate process in comparison with the dihydrate process is the adsorption of a large amount of uranium in hemihydrate gypsum. The present invention has succeeded in practically completely eliminating this disadvantage. Moreover, the loss of uranium in a process according to the invention by adsoprtion in hemihydrate gypsum becomes smaller than the loss in the conventional dihydrate process, and this holds even when an oxidizer is used in the dihydrate process to render uranium in the solution entirely hexavalent.

A high uranium-content phosphoric acid solution obtained by a process according to the invention can be subjected to a known process of concentrating or recovering uranium such as a solvent extraction process.

DETAILED DESCRIPTION OF THE INVENTION

By analysis of uranium contained in crude phosphoric acid solutions obtained by the decomposition of phosphate rock with sulfuric acid and phosphoric acid, we have confirmed that about 55% of uranium contained in each acid solution exists in the tetravalent form and the remaining about 45% in the hexavalent form. Considering this fact together with the above described fact that hemihydrate gypsum formed in a crude phosphoric acid solution captures about a half quantity of uranium contained in the acid solution, we presumed that hemihydrate gypsum in the acid solution might selectively adsorb either tetravalent ions or hexavalent ions or uranium. This presumption was verified by some experiments the gist of which was as follows.

A slurry of dihydrate gypsum in a crude phosphoric acid was prepared by the usual wet process decomposition of phosphate rock with a mixed acid of sulfuric acid and phosphoric acid. In one series of runs, a reducing agent such as iron powder was added to the dihydrate gypsum slurry in order to reduce the entire quantity or uranium contained in the crude phosphoric acid to tetravalent ions, and at the same time sulfuric acid was added to the slurry so as to lower the $P_2O_5$ concentration to a level suitable for transition of dihydrate gypsum to hemihydrate gypsum. Thereafter the temperature of the slurry was raised above the dihydrate-to-hemihydrate transition point to cause substantially complete transition of the gypsum in the slurry to hemihydrate gypsum. In the other series of runs, an oxidizing agent such as $KClO_3$, $NaClO_3$ or $H_2O_2$ was added to the dihydrate gypsum slurry instead of the aforementioned reducing agent in order to oxidize the entire quantity of uranium in the acid solution to hexavalent ions. The addition of sulfuric acid and the heating of the slurry were performed in the same way as in the former runs, so that the dihydrate gypsum in the slurry was converted to hemihydrate gypsum.

Analysis of the hemihydrate gypsum obtained in every run revealed that hemihydrate gypsum formed in the acid solution containing tetravalent ions of uranium had adsorbed practically 100% of uranium contained in the solution, whereas hemihydrate gypsum formed in the acid solution containing hexavalent ion of uranium had adsorbed only about 1% of uranium contained in the solution.

Besides, we have carried out comparable experiments in which the valence of uranium in a crude phosphoric acid solution was controlled to tetravalence or hexavalence at the stage of forming dihydrate gypsum. As a result, it has become clear that the use of an oxidizing agent at this stage to form dihydrate gypsum in the presence of hexavalent uranium ions has only a very small influence on the adsorption of uranium by the gypsum. For example, when the aforementioned wet process decomposition of phosphate rock with the mixed acid was performed by adding $NaClO_3$ to the mixed acid at the stage of decomposing the phosphate rock in order to oxidize uranium dissolved in the mixed acid to hexavalent ions, about 2.5% of uranium contained in the phosphate rock transferred into dihydrate gypsum formed by the decomposition reaction. In comparison, when the same decomposition process was performed without adding any oxidizing agent to the mixed acid, about 5% of uranium contained in the phosphate rock transferred into the resultant dihydrate gypsum.

By further experiments, we have confirmed that the transfer of uranium from the crude phosphoric acid solution into hemihydrate gypsum can practically perfectly be prevented by oxidizing uranium in the solution to the hexavalent form at the stage of forming hemihydrate gypsum not only in the dihydrate-hemihydrate process but also in other types of wet processes in which hemihydrate gypsum is formed as typified by the hemihydrate process and the hemihydrate-dihydrate process (not limited to the case of first separating the precipitated hemihydrate gypsum from the crude phosphoric acid solution and subsequently converting the hemihydrate to dihydrate gypsum, but including the case of crystallizing dihydrate gypsum via the hemihydrate form). In any one of these processes, the oxidation of uranium in the acid solution is effected in advance of crystallization of hemihydrate gypsum or at the stage of crystallization of hemihydrate gypsum. In the dihydrate-hemihydrate process and also in the hemihydrate-dihydrate process, it is important that an oxidizing agent be added to the acid solution when the $P_2O_5$ concentration and temperature of the solution are so adjusted as to allow crystallization of hemihydrate gypsum. A sufficient effect of the addition of the oxidizing agent cannot be obtained if the addition is effected under conditions suited to crystallization of dihydrate gypsum.

As the oxidizing agent used in a process according to the invention, it is suitable to use a water-soluble inorganic oxidizing compound such as potassium chlorate, sodium chlorate, potassium permanganate, hydrogen peroxide, nitric acid or a nitrate. Also it is possible to use a gaseous oxidizer such as air or oxygen gas. In any case, the quantity of the oxidizing agent should be larger than a quantity theoretically needed for oxidation of tetravalent uranium existing in the reaction system to the hexavalent form. It is recommended to use an oxidizing agent in a quantity 25 to 100 times as large as the theoretical quantity.

In the dihydrate-hemihydrate process, it is optional whether to add an oxidizer into the dihydrate gypsum slurry in advance of raising the temperature of the slurry to cause transition of the gypsum to hemihydrate gypsum or to add the oxidizing agent during heating of the slurry to cause transition of the gypsum to hemihydrate gypsum. In the hemihydrate process or in the hemihydrate-dihydrate process, an oxidizing agent may be added to the mixed acid for decomposition of phosphate rock to thereby achieve the oxidation of tetravalent uranium and the formation of hemihydrate gypsum simultaneously.

The following examples illustrate the present invention.

EXAMPLE 1

(dihydrate-hemihydrate process)

In a conventional apparatus for laboratory manufacture of wet process phosphoric acid, crushed phosphate rock having a $P_2O_5$ content of 34% and a uranium content of 118 ppm was continuously decomposed at a feed rate of 11.4 kg/hr by continuously and simultaneously supplying 4.7 kg/hr of 98% sulfuric acid and 45.5 kg/hr of recycle phosphoric acid (after separation of hemihydrate gypsum as described below; containing 15.4% by weight $P_2O_5$ and 82 ppm of U) to the reactor and maintaining the temperature of the reaction system at 70°–80° C. By this decomposition process, a dihydrate gypsum slurry was obtained at a rate of 54.2 kg/hr. The solid content in the slurry was 33% by weight, and the uranium content was 94 ppm.

This slurry was filtered to separate a portion of the acid solution and give a sufficiently wet dihydrate gypsum or a concentrated dihydrate gypsum slurry at a rate of 41.7 kg/hr. The uranium content in the concentrated slurry was 74 ppm, and the uranium content in the dihydrate gypsum in this slurry was 4 ppm. Then, 60% sulfuric acid was added to the concentrated slurry, and $KClO_3$ was added to the same slurry in a quantity amounting to 0.02% by weight of the slurry. Thereafter the temperature of the slurry was raised and maintained above 80° C. until complete transition of the dihydrate gypsum to hemihydrate gypsum. The resultant hemihydrate gypsym slurry was filtered to obtain 15.2 kg/hr of hemihydrate gypsum cake and 45.5 kg/hr of filtrate solution, which included 10 kg/hr of washing water and was used as recycle phosphoric acid. The uranium content in the hemihydrate gypsum cake was only 1 ppm. The $P_2O_5$ content in the filtrate solution was 15.4% by weight, and the uranium content was 82 ppm. By analysis, it was confirmed that 55% of uranium contained in the initially prepared dihydrate gypsum slurry was in the tetravalent form and the remaining 45% was in the hexavalent form, whereas uranium in the phosphoric acid after separation of hemihydrate gypsum was entirely in the hexavalent form.

In this process, the loss of uranium by adsorption is hemihydrate gypsum was only about 1% of total uranium.

When this process was modified by performing the addition of $KClO_3$ during the initial stage of decomposing phosphate rock to form dihydrate gypsum instead of the addition of the same oxidizer immediately before the conversion of dihydrate gypsum to hemihydrate gypsum, the loss of uranium by adsorption in the finally obtained hemihydrate gypsum increased to about 8% of total uranium.

REFERENCE 1

The dihydrate-hemihydrate process of Example 1 was performed by omitting the addition of $KClO_3$ to the dihydrate gypsum slurry (or to the mixed acid for decomposition of the phosphate rock). As the result, about 60% of total uranium was adsorbed in the finally formed hemihydrate gypsum.

EXAMPLE 2

(hemihydrate-dihydrate process)

Using a conventional laboratory apparatus including two decomposition tanks arranged in series, phosphate rock containing 31.2% by weight of $P_2O_5$ and 100 ppm of uranium was continuously decomposed at a feed rate of 6.2 kg/hr by simultaneously supplying 5.5 kg/hr of 98% sulfuric acid and 16.6 kg/hr of weak phosphoric acid (containing 4.4% by weight $P_2O_5$ and 10.3 ppm of U) to the first stage decomposition tank such that the decomposition reaction continued for 2 hr at a temperature of 90°–95° C. In this decomposition process, $H_2O_2$ was introduced into the first stage decomposition tank in a quantity amounting to 0.03% of the reaction solution. The product of this decomposition process was a slurry of hemihydrate gypsum in a crude phosphoric acid solution.

This slurry was subjected to a hydration process in three hydration tanks arranged in series. The hydration was performed at a temperature of 60°–65° C., and a dihydrate gypsum slurry discharged from the last stage hydration tank was continuously returned to the first stage hydration tank. The total duration of the hydration process was 6 hr.

In a hemihydrate gypsum slurry at the outlet of the second stage hydration tank, the quantity of uranium contained in the hemihydrate gypsum was about 1% of uranium contained in the phosphate rock. The remaining 99% of uranium was present in the phosphoric acid solution as the liquid phase of this slurry. The $P_2O_5$ content in this phosphoric acid solution was 26.4%, and the uranium content was 62 ppm. This hemihydrate gypsum slurry was subjected to further hydration in the third stage hydration tank. In a dihydrate gypsum slurry at the outlet of the third stage tank, the uranium content in the dihydrate gypsum was 0.5 ppm and calculated to be about 1% of uranium contained in the phosphate rock. The P₂O₅ content in this dihydrate gypsum was 0.47%.

When this process was modified by introducing $H_2O_2$ into the third stage hydration tank (without introducing $H_2O_2$ into the decomposition tanks), the dihydrate gypsum at the outlet of the third stage hydration tank contained 0.47% of $P_2O_5$ and 2.7 ppm of U, amounting to about 5% of uranium contained in the phosphate rock.

REFERENCE 2

The hemihydrate-dihydrate process of Example 2 was repeated except that the initial decomposition process was performed without introducing $H_2O_2$ into the decomposition tank and that the uranium content in the weak phosphoric acid used in the decomposition process was 9.4 ppm.

In this case, the dihydrate gypsum at the outlet of the third stage hydration tank contained 0.47% of $P_2O_5$ and 5.4 ppm of U, which amounted to about 10% of uranium contained in the phosphate rock.

EXAMPLE 3A (hemihydrate process)

Crushed phosphate rock containing 33.4% of $P_2O_5$ and 150 ppm of uranium was continuously decomposed in an apparatus including two reactors arranged in series. The phosphate rock was fed into the first reactor at a rate of 17 kg/hr, and a recycle phosphoric acid containing 2% of sulfuric acid, 48.9% of $P_2O_5$ and 9.2 ppm of U was simultaneously introduced into the same reactor at a rate of 274 kg/hr. This recycle phosphoric acid was a mixture of a liquid phase (224 kg/hr, 50% $P_2O_5$) of a slurry discharged from the second reactor and a filtrate-washing solution (50 kg/hr, 44% $P_2O_5$) consisting of a filtrate (crude phosphoric acid) and washing water returned from the subsequent filter. In addition, $KMnO_4$ was introduced into the first reactor in a quantity amounting to 0.02% of the reaction solution.

The reaction temperature in the first reactor was 105° C., and the reaction solution was allowed to overflow into the second reactor. In the second reactor the decomposition reaction was completed by adding 96% sulfuric acid at a rate of 16 kg/hr and maintaining a reaction temperature of 105° C. Calcium sulfate precipitated in this reaction was entirely in the form of hemihydrate gypsum. A portion of the hemihydrate gypsum slurry discharged from the second reactor was recycled to the first reactor, and the remaining portion was filtered to obtain a cake of hemihydrate gypsum, which was washed with water and dried. The dry weight of the thus obtained hemihydrate gypsum was 22.5 kg/hr. The results of analysis will be shown in the following Tables 1 and 2.

EXAMPLE 3B

The hemihydrate process of Example 3A was repeated generally similarly except that the introduction of $KMnO_4$ into the first reactor was omitted and that, instead, $NaClO_3$ was introduced into the second reactor in a quantity amounting to 0.02% of the reaction solution.

EXAMPLE 3C

This example was generally similar to Example 3B, but oxygen gas was introduced into the second reactor at a rate of 14.4 liters per hour instead of $NaClO_3$ in Example 3B.

REFERENCE 3

The hemihydrate process of Example 3A was repeated generally similarly, but neither $KMnO_4$ nor any alternative oxidizer was introduced into the first reactor or the second reactor.

In Examples 3A, 3B and 3C and Reference 3, the analysis of uranium contained in the dried hemihydrate gypsum gave the results as shown in Table 1. The analysis of the hemihydrate gypsum slurry at the outlet of the second reactor and the recycled phosphoric acid solution gave the results as shown in Table 2.

TABLE 1

|  | Oxidizer | Uranium in Hemihydrate Gypsum | Transfer of U Contained in Phosphate Rock into Gypsum |
|---|---|---|---|
| Example 3A | $KMnO_4$ | 1.3 ppm | 1.1% |
| Example 3B | $NaClO_3$ | 1.7 ppm | 1.5% |
| Example 3C | $O_2$ | 2.3 ppm | 2% |
| Reference 3 | not used | 50 ppm | 44% |

TABLE 2

|  | Uranium in Hemihydrate Gypsum Slurry ($P_2O_5$ = 50%) | Uranium in Recycle Phosphoric Acid ($P_2O_5$ = 48.9%) |
|---|---|---|
| Example 3A | 9.0 ppm | 8.8 ppm |
| Example 3B | 9.0 ppm | 8.8 ppm |
| Example 3C | 8.9 ppm | 8.7 ppm |
| Reference 3 | 5.1 ppm | 5.0 ppm |

REFERENCE 4A (dihydrate process)

Crushed phosphate rock containing 33% of $P_2O_5$ and 110 ppm of uranium was continuously decomposed in a decomposition tank at a feed rate of 10 kg/hr by continuously and simultaneously supplying 8.4 kg/hr of 98% sulfuric acid and 38 kg/hr of recycle phosphoric acid (containing 32% of $P_2O_5$ and 21.2 ppm of uranium) into the decomposition tank. The temperature of the reaction system was maintained at 70°-75° C.

This process gave 39 kg/hr of crude phosphoric acid containing 40% of $P_2O_5$ and 26.5 ppm of U and 15 kg/hr of dihydrate gypsum containing 4.4 ppm of U, which was calculated to be 6% of uranium contained in the phosphate rock.

REFERENCE 4B

The dihydrate process of Reference 4A was modified by introducing $NaClO_3$ into the decomposition tank in a quantity amounting to 0.03% of the reaction solution.

In this case, the uranium content in the obtained phosphoric acid solution was 28.2 ppm, and the obtained dihydrate gypsum contained 1.5 ppm of uranium which was calculated to be 2% of uranium contained in the phosphate rock.

What is claimed is:

1. In a method for recovering uranium from phosphate rock containing uranium by decomposing the phosphate rock containing uranium in a wet process with sulfuric acid and phosphoric acid to form phosphoric acid containing uranium and gypsum, and recovering the uranium, the improvement comprising forming hemihydrate gypsum in a solution containing phosphoric acid and an oxidizing agent in an amount sufficient to render uranium dissolved in said solution substantially entirely hexavalent.

2. A method according to claim 1, wherein said hemihydrate gypsum is formed substantially simultaneously with decomposition of the phosphate rock.

3. A method according to claim 1, wherein said hemihydrate gypsum is formed by conversion of dihydrate gypsum which is formed substantially simultaneously with decomposition of the phosphate rock.

4. A method according to claim 1, wherein said hemihydrate gypsum is formed substantially simultaneously with decomposition of the phosphate rock but is subsequently converted to dihydrate gypsum.

5. A method according to claim 1, wherein said oxidizing agent is a water-soluble inorganic solid material.

6. A method according to claim 5, wherein said oxidizing agent is selected from chlorates, permanganates, peroxides and nitrates.

7. A method according to claim 1, wherein said oxidizing agent is an inorganic liquid material.

8. A method according to claim 7, wherein said oxidizing agent is selected from hydrogen peroxide and nitric acid.

9. A method according to claim 1, wherein said oxidizing agent is an oxygen-containing gas.

10. A method according to any one of claims 5, 7 and 9, wherein said quantity of said oxidizing agent is 25 to 100 times as large as a theoretical quantity needed for oxidation of tetravalent uranium existing in said solution.

* * * * *